United States Patent [19]

Anneken

[11] Patent Number: 4,637,297
[45] Date of Patent: Jan. 20, 1987

[54] MEANS OF ISOLATING AUTOMOBILE BLOWER INTAKE FROM ENGINE COMPARTMENT AND EXHAUST FUMES

[76] Inventor: James G. Anneken, 6187 Kingoak Dr., Cincinnati, Ohio 45248

[21] Appl. No.: 732,945

[22] Filed: May 13, 1985

[51] Int. Cl.[4] .............................................. B60H 1/00
[52] U.S. Cl. ........................................ 98/2; 180/68.2; 296/91; 296/208
[58] Field of Search .............. 98/2; 180/68.2; 296/91, 296/208

[56] References Cited

U.S. PATENT DOCUMENTS

| | | | |
|---|---|---|---|
| 1,865,675 | 7/1932 | Cavanaugh | 296/91 X |
| 3,451,469 | 6/1969 | Hall et al. | 180/68.2 X |
| 3,695,679 | 10/1972 | Wilfert | 296/91 |
| 3,769,898 | 11/1973 | Ide | 98/2 |
| 4,470,341 | 9/1984 | Hirukawa et al. | 98/2 X |

OTHER PUBLICATIONS

GM 1981 Fisher Body Service Manual, pp. 1B-45; 2C-6.
GM 1982-1983 Parts and Illustration Catalog, pp. 8-20, 8-21, 8-22, 10-1.

Primary Examiner—Albert J. Makay
Assistant Examiner—Steven E. Warner
Attorney, Agent, or Firm—Wood, Herron & Evans

[57] ABSTRACT

Disclosed is an isolator for preventing fumes from the engine compartment and exhaust of a motor vehicle from entering a curbside blower intake of the vehicle. In a preferred form, the isolator also establishes an air curtain which projects outwardly adjacent the windshield, to deflect forward moving exhaust fumes from entering the blower intake.

14 Claims, 5 Drawing Figures

MEANS OF ISOLATING AUTOMOBILE BLOWER INTAKE FROM ENGINE COMPARTMENT AND EXHAUST FUMES

FIELD OF THE INVENTION

This invention relates to a means of restricting the intake, by the passenger compartment air blower of an automobile, of engine compartment and exhaust fumes.

BACKGROUND OF THE INVENTION

In most automobiles of recent vintage the passenger compartment is supplied with air by a blower having an intake or grille which opens upwardly, in front of the windshield. This intake, which is sometimes under the hood itself, is separated from the engine compartment by a so-called hood gasket, which usually engages the underside or edge of the hood between the inlet and the engine. The purpose of the hood gasket is to reduce the intake by the blower of heat, humidity, and potentially harmful fumes (including particulates) from the engine compartment. (As used herein the term "engine compartment fumes" is meant to include all gases coming from or through the engine compartment, radiator cooling air, entrained dust, particles of brake composition from the wheel wells, exhaust from preceding vehicles, and the like.)

If the blower intake is near or on the centerline of the vehicle, the intake is usually sufficiently well isolated from the engine compartment by the hood gasket that the blower receives air from the relatively "clean" space above the hood or cowl and in front of the windshield, and which is not contaminated with engine compartment fumes.

However, I have observed that where the blower intake is located near the curb- or "off-side" of the vehicle (as it is for example in downsized General Motors rear wheel drive cars made in 1977–1985 and having B, C, D and AG type bodies), the blower intakes engine compartment fumes more frequently. Such fumes escape from the engine compartment around the end of the hood gasket, and in part are swept into the blower intake, from which they are circulated into the passenger compartment. Moreover, under certain wind conditions, or where there are obstructions adjacent the vehicle or the tailpipe, the exhaust gas "plume" from a curbside tailpipe will travel forwardly along the body and will contaminate air entering the intake. (In cold weather this plume can be traced as "white smoke.")

I have further observed that when such a vehicle is stopping or has just stopped, dust particles in its wake can sometimes continue to move forwardly along the side of the car, across the window post, and can be pulled into the blower intake from the curb side. This flow path can be seen when a car traveling on a dusty road stops: the dust wake travels forward along the sides of the car and curves across the corners of the hood, into the blower intake and the radiator. (As used herein, the term "exhaust fumes" is meant to include dust wake as well as tailpipe gas.)

Clearly, the direct circulation by the blower into the passenger compartment of engine compartment or exhaust fumes, indeed of any air except clean outside air, is uncomfortable at the very least, may contribute to unintentional carbon monoxide intake, and may be potentially harmful.

THE PRIOR ART

In order to reduce the intake of contaminated air by a curbside blower intake, it is known to mount small end baffles under the hood, between each end of the hood gasket and the respective inside fender panel, such as are provided for GM diesel cars. Such auxiliary baffles help to restrict engine fumes from flowing into the blower inlet, but they do not completely block such flow. However, such baffles tend to confine the fumes under the hood and thereby increases underhood temperatures which, in turn, can lead to seal warpage and more rapid deterioration. Moreover, hood gasket end baffles do nothing to help prevent exhaust or other air contaminants from the curbside of the vehicle from drifting into the adjacent blower intake.

It is, therefore, the purpose of this invention to provide an improved structure for more effectively restricting the flow of engine compartment and exhaust fumes into the blower intake. It is a further object to provide such structure in a form which can easily be retrofitted to existing cars.

BRIEF DESCRIPTION OF THE INVENTION

In accordance with this invention, an intake isolator is provided which "channels" the inflow of air to the blower so that the blower receives air from a more central region, i.e., toward the centerline of the car, away from the curbside, any engine compartment vents, and any forward or sideward moving exhaust plume or wake. Moreover, this isolator also outwardly deflects engine compartment fumes which otherwise could enter the blower intake around the end of the hood gasket.

In preferred form the invention also restricts the in-flow of the car's exhaust plume and its own wake, by establishing an air curtain or "fountain" which jets outwardly from the isolator to intercept any such forwardly moving exhaust plume and wake. This curtain is directed outwardly at the rear edge of the hood, adjacent the curbside front window column, and deflects the flow of an exhaust plume or wake away from the blower intake. Preferably a second air curtain projects centrally across the windshield and intercepts any intake air cross current.

The isolator is mounted behind and on the curbside of the intake. It is generally of triangular or "T" shape, as seen from above, having a connector or apex at its forward end which is secured and sealed to the end of the hood gasket, and a base rearwardly which seals on or adjacent the windshield or windshield lower edge molding. One side or face (the "outside or curbside face") of this triangular shape obliquely faces the curb side of the vehicle and deflects engine compartment air rearwardly and outwardly, away from the blower intake. The second side or face (the "inside face") of the triangular shape extends obliquely, toward the vehicle's centerline, behind the intake. This inside face channels or focuses air into the blower intake from the relatively clean air region near the centerline of the car, in front of the windshield. The isolator is hollow, seals upwardly against the underside of the hood, and is collapsible in the event of a wreck.

In the preferred embodiment of the isolator, a special passage or conduit delivers a pressurized air stream, preferably taken from the blower outlet, into the interior of the isolator, from which it is discharged through one or more outlet nozzles in the base or corners of the isolator. Each nozzle discharges a curtain or stream through the gap between the hood and the windshield. An outward or curbside nozzle discharges a stream at an angle to the side surface of the vehicle, across the path which a forwardly moving exhaust plume or wake would follow, to intercept it and thereby prevent it from entering the intake. Alternatively or in addition, an inward or central nozzle discharges a stream centrally above the windshield to screen cross-flow to the inlet.

A venturi opening is preferably provided as an underhood slot between the inside fender panel and the outside corner of the isolator, adjacent the curbside nozzle. This restricted opening provides communication between the engine compartment and the high velocity stream coming from the curbside nozzle. The high velocity of the curbside stream reduces pressure at the venturi opening so that engine compartment fumes are drawn into the curtain and are discharged outwardly with it. This increases the temperature of the curtain and at the same time reduces below hood heat build-up.

The invention can best be further described and understood by reference to the accompanying drawings, in which.

As used herein, the term "blower" means the blower which services the passenger compartment of a vehicle. The term "automobile" is meant to include trucks as well.

Figure 1:
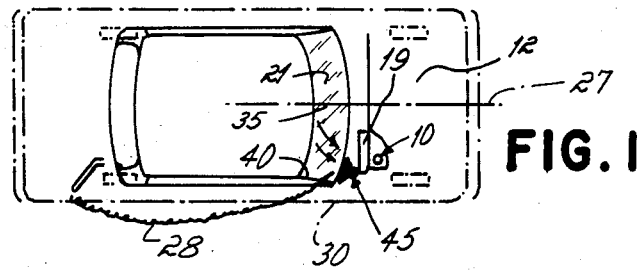
FIG. 1 is a plan view, partly broken away, showing the orientation of the blower and its intake in the automobile, and showing the general position of the isolator with respect to the blower intake, hood gasket and the curbside fender.

This invention is especially adapted to be used with a vehicle with a blower having both a curbside intake and a curbside tailpipe, as shown generally in FIG. 1. The blower, indicated generally at 10, is mounted under the hood 11 between the engine compartment 12 and forward of the dash panel 13. Usually a heater 16 and an air conditioner evaporator core 15 are mounted close to the blower. Blower 10 has an intake 19 which opens upwardly through the cowl 20, just in front of the windshield 21 and in front of the wiper blade 22. A flexible hood gasket 25 engages the underside of hood 11 and forms a partial seal between the engine compartment and the blower intake. Gasket 25 is seated on a ledge at the front of the dash panel 13. The hood gasket 25 extends laterally across the vehicle centerline 27, between but not to the fender panels. The intake opening 19 of the blower through cowl 20 is located near the curbside 30 of the vehicle. Hood gasket 25 extends in front of opening 19 and bends toward, but does not extend to, the windshield 21, by a return portion 31. The intake 19 is flared through a trough portion 33, toward centerline 27 of the vehicle, so as to provide a greater inlet area and a below-hood flow path to the intake from the air space 35 above the centerline of the car, in front of the windshield.

The function of hood gasket 25 is to prevent air from passing into blower intake 19 from engine compartment 12, so that it is not circulated into the passenger compartment. However, I have found that the hood gasket is not altogether effective for this purpose, and in the absence of the present invention, engine compartment fumes can and do flow around gasket end 37 and into the intake, as designated by the dashed line 26. This can be demonstrated by the use of a smoke generator, or by temperature sensors.

As already noted, apart from and in addition to its function of isolating the intake from engine compartment fumes, the invention in its preferred form also reduces entry of any forward moving curbside tailpipe plume 28 or any dust wake into the blower. When the car is stopping or has just stopped, or when it is stopped close to a wall, or when a tail wind exceeds the speed of the car, the wake from the rear of the car, e.g. road dust, can flow or be blown fowardly along the side of the car past the window post 40, and into the intake. Tailpipe fumes from other traffic can also enter the intake.

Figure 3:
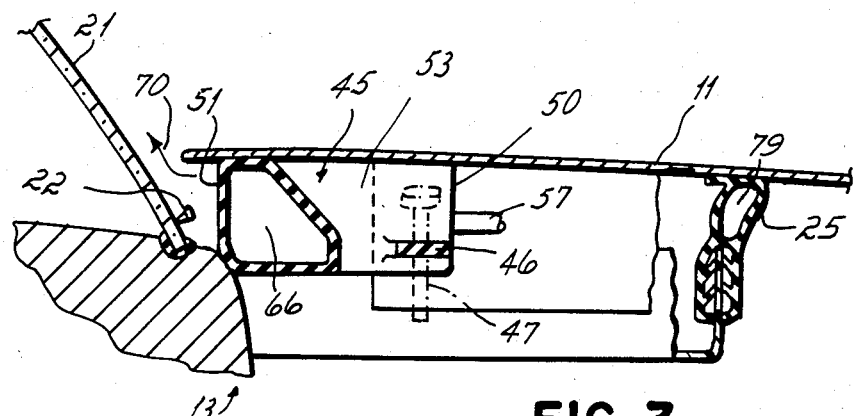
FIG. 3 is an enlarged vertical longitudinal section taken generally on line 3—3 of FIG. 2.

To overcome both such disadvantages of present off-side intakes, I have provided an isolator, a preferred form of which is designated generally by 45. The isolator is secured and sealed to the end 37 of the hood gasket. Rearwardly it forms a seal with the windshield 21 or windshield lower edge molding, just above the top of the dash. The isolator is connected at its forward end to the hood gasket, and optionally is supported by a resilient tab 46 which is slipped over the coventional hood restraint bolt 47. The isolator is also supported from below on the dash panel 13, and/or from the windshield spray nozzle mount. The top of the isolator engages and seals with the underside of the hood, see FIG. 3.

Figure 2:
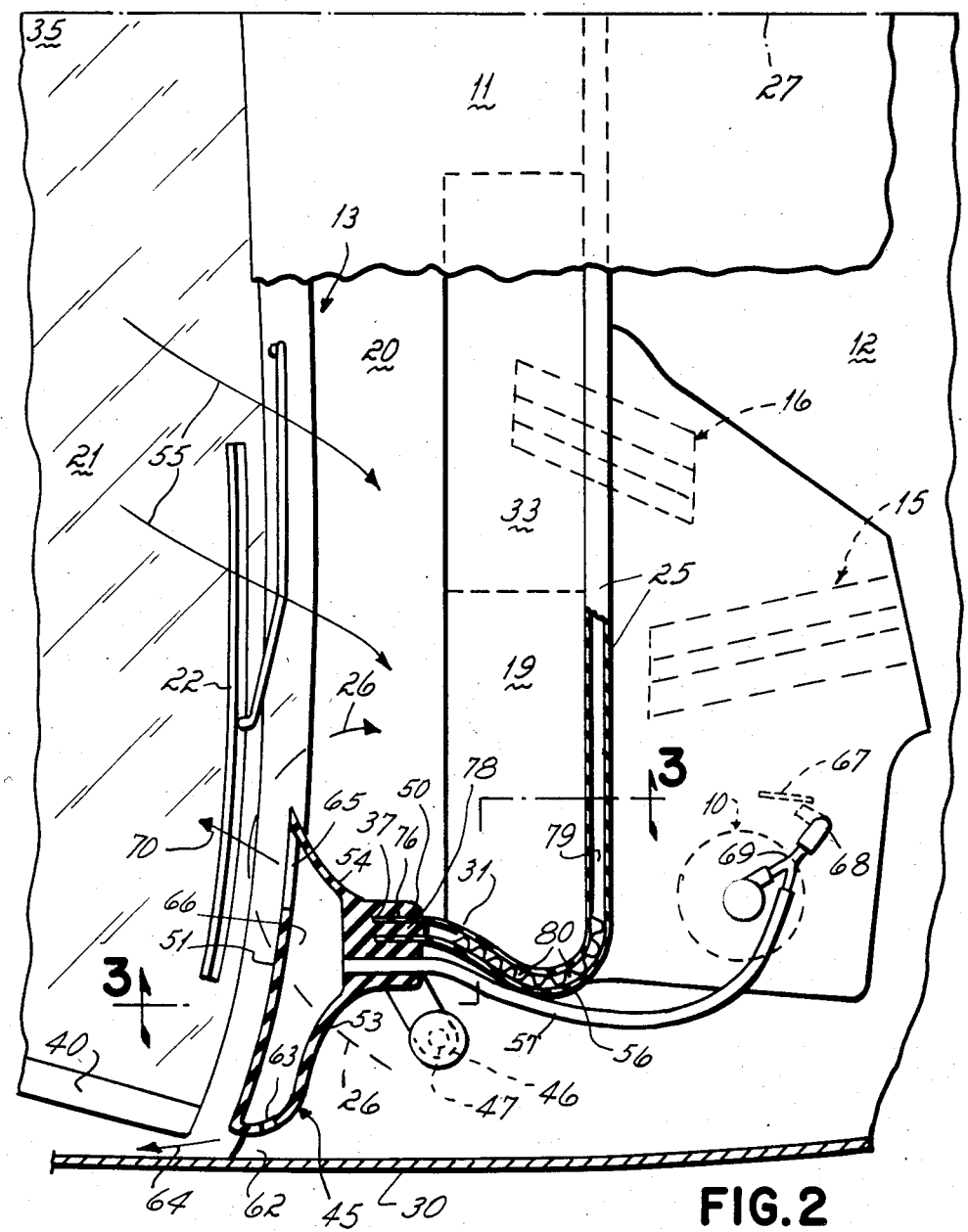
FIG. 2 is an enlarged plan, partly in section, of a preferred form of isolator in accordance with the invention, showing diagrammatically the manner in which the isolator channels flow into the intake, and also showing the venturi means for removing engine compartment fumes.

As viewed in plan (see FIGS. 2 and 5), the isolator is preferably triangular or T-shaped, having an apex 50 at the front and a broad base 51 at the rear. The isolator has an outside or curbside face 53 on the curb side of the car, and an inside face 54 toward the centerline of the car. As shown in FIG. 2, the faces 53 and 54 are curved for smooth air flow, toward the outside of the car and toward air space 35, respectively. The isolator may be a unitary one-piece plastic or rubber molding. It should be caulked to the windshield for stability and optimum seal. It is preferably hollow and it can collapse under weight of the hood, so that it does not act as a fulcrum exerting a lifting force on the hood end in the event of a crash.

In operation of the car, engine compartment fumes which pass around knee 56 of the hood gasket and move toward the hood gasket end 37, are deflected diagonally outwardly by outside face 53 of the isolator, and are discharged or vented through the conventional slot or gap between the hood edge and the windshield. Thus the underhood intake 19 is isolated from these fumes, which otherwise could curl around hood gasket end 37 along the path shown by dashed line 26. The inside face 54 channels or focuses air flowing downwardly into the intake so that it passes diagonally sideways from the centerline area 35, as indicated by arrow 55. To the extent that a plume of exhaust gas or a dust wake 28 moves forward along the side of the car, or if the vehicle is sitting in a sea of exhaust fumes from traffic, the blower preferentially receives air from the centerline rather than from the side of the car. The isolator is contoured so that it does not obstruct engagement of the hood restraint bolt by the hood.

Figure 4:
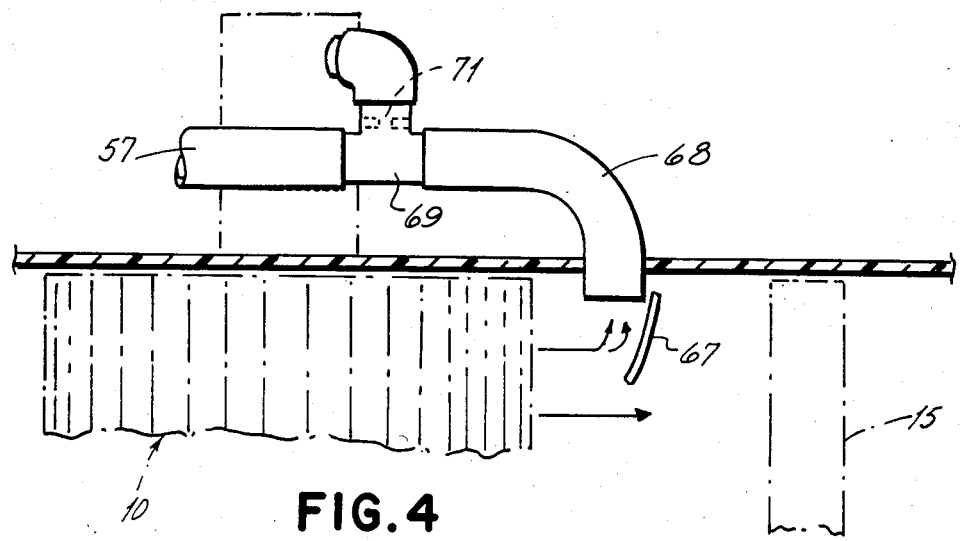
FIG. 4 is an enlarged view showing a preferred form of high velocity air supply for the venturi.
Figure 5:
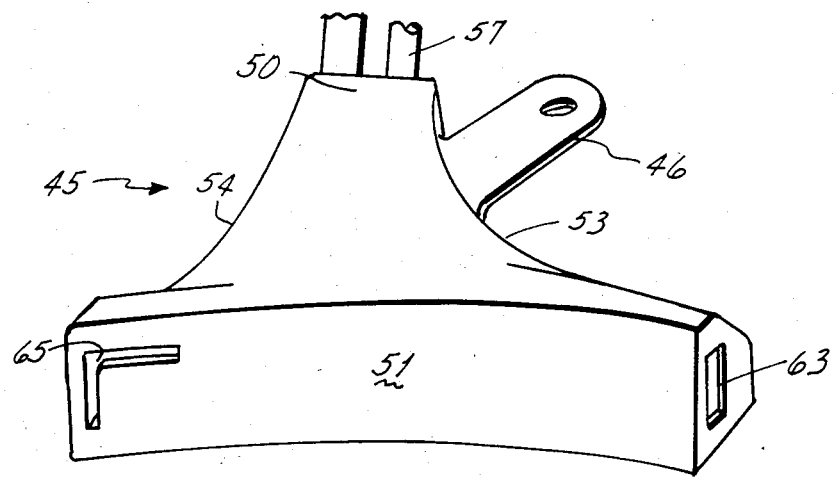
FIG. 5 is an enlarged perspective view of the base of the isolator showing the air curtain nozzles.

FIGS. 2, 4 and 5 show a preferred embodiment of the invention which, in addition to isolating the intake from the flow of engine compartment fumes and channeling the intake toward the centerline, also provides air curtains or jets 64 and 70 which intersect and divert any forward moving stream of exhaust gas or wake.

These fountains or curtains of air may be established by two sources: a first stream of pressurized air taken from the blower itself, and a secondary stream of engine compartment fumes, which are pulled outwardly with the first stream through a venturi.

For this purpose, as shown in FIG. 2, an air conduit or tube 57 leads from the blower discharge side, where the blower outputs air under positive pressure. Tube 57 leads rearwardly into the hollow interior 66 of isolator 45. A curbside nozzle or jet outlet 63 opens at the outer corner of the isolator, adjacent a narrow slot 62 between the isolator and the inside fender panel 30. This outlet is directed to establish an air curtain 64 which projects outwardly and upwardly from the cowl at an angle from the centerline, preferably as shown in FIG. 2. The jet intersects and interrupts the forward flow of any exhaust stream on the side of the car. Slot 62, between the isolator and the fender, adjacent curbside nozzle 63, acts as a venturi which opens to and communicates with the engine compartment. Velocity of the primary stream of air from nozzle 63 reduces the sidewise pressure at the venturi, thereby creating a relatively low pressure zone at the entrance of slot 62, so that engine compartment fumes are drawn into the venturi and are swept out along with the primary stream. This reduces under-hood temperatures by increasing the rate of removal of engine compartment heat and gases.

Apart from curbside nozzle 63, a separate inside nozzle 65 may be used to provide a second air curtain projecting toward the centerline. This nozzle 65 directs a jet 70 against the underside of the hood (see FIGS. 3 and 5), which then directs it across the windshield, thereby to deflect cross currents of intake flow.

Fumes pulled through the venturi are exhausted only with the curbside curtain; only blower discharge air (which is clean air) is vented through nozzle 65 toward the centerline. The nozzle outlets are desirably defined below the hood seal at the top of the isolator (see FIG. 3), so that they are protected from leaves and precipitation.

The pressurized air supplied to the isolator can be taken or split from the blower coolant flow. Conventionally, air for cooling the blower motor is taken from the blower discharge stream by a scoop 67 in its path. This scoop supplies pressure into a cooling tube 68. The coolant tube leads into the top or axis of the blower, where the stream is applied to cool the motor. Part of this coolant flow can be taken off through a "Y" connection 69, to which conduit 57 is connected. "Y" connector 69 may include a restrictor 71 to limit the rate of flow of cooling air into the blower motor. A larger size scoop than is conventionally supplied is desirable to provide additional air for the air curtain.

Alternatively, air for the nozzle can be taken from the blower resistor port, that is, where blower discharge airstream passes over the conventional resistor coils which control blower speed. This alternate provides warmer air and a defrosting capability, and does not interfere with blower motor coolant air.

In order to easily retrofit the present isolator on automobiles having a curbside blower intake with a hood gasket 25 extending partly but not entirely around the intake, the isolator is molded so that the hood gasket end 37 can be received into a socket 76 in the apex 50 of the isolator. It is desirable to provide an adjustable sealed connection at this socket to prevent flow into the blower intake from the engine compartment, ahead of the isolator. For this purpose a male connector 78 may be provided in the isolator socket, to plug into the hollow interior or bulb 79 of gasket 25. An anti-distortion insert 80 is also provided and is preferably long enough to extend around the knee 56 of the gasket, thereby to prevent the gasket collapse which sometimes occurs with age or gasket deterioration, and which if it occurred would itself provide a leak passage into the blower intake.

When the car is stopped or moving slowly, the intake of air by the blower creates a relatively low pressure zone at the intake, whereas the engine compartment is under a slight but positive pressure relative to it. In order to prevent short circuiting of air into the blower intake around the other (driver side) end of the hood gasket, and to prevent fumes from entering the driver's window, a conventional seal is desirable at that end of the gasket. The plug 78 at the apex precludes end-to-end flow through the gasket bulb itself.

The isolator can conveniently be attached to the hood gasket and can be mounted and sealed to the car without other fitting. Once installed, it needs no servicing and helps to insure that the blower receives outside air which is not contaminated by engine compartment or exhaust fumes.

Having described the invention, what is claimed is:

1. In an automobile having a blower for delivering air into the passenger compartment, said blower having an air intake adjacent the curb side of the vehicle, said intake being beneath the hood and in front of the windshield, said automobile also having a tailpipe on the same side as said intake and a hood gasket which engages the underside of the hood in front of said intake;

a blower intake isolator for restricting the flow of engine compartment and exhaust fumes into said intake, said isolator comprising an air flow deflector having an apex secured to said gasket, on the curbside of the blower intake, said isolator having an outside face which curves rearwardly and outwardly from said apex to an outer corner located inwardly adjacent the curbside fender, said isolator having an inside face which extends from said apex inwardly and rearwardly of the blower intake, diagonally toward the centerline of said automobile, and a base extending between said faces and adjacent the windshield, said outside face of said isolator deflecting engine compartment fumes outwardly and away from the blower intake, said inside face of said isolator chaneling air to flow into said intake from a region above the centerline of the automobile.

2. The isolator of claim 1 wherein the isolator is sealed to an end of the hood gasket on the curb side of the blower intake.

3. The isolator of claim 1 wherein the isolator has a broad supporting bottom and a flexible upper portion which seals upwardly against the hood.

4. The isolator of claim 1 wherein the isolator is supported by a tab engaging a hood restraint bolt.

5. The isolator of claim 1 further including air curtain means comprising,
a conduit supplying air discharged by the blower, through the isolator to an outlet nozzle, said nozzle located between the hood and the windshield, said nozzle directing flow outwardly as an air curtain projecting at an angle to the surface of the automobile.

6. The isolator of claim 5 wherein said nozzle is located in a corner of said isolator, adjacent the curbside of the automobile, and directs said air curtain above a window column.

7. The isolator of claim 5 wherein said nozzle is located in the base of the isolator near the inside face thereof, and directs said air curtain diagonally toward the centerline of the automobile.

8. The isolator of claim 5 further wherein said conduit is supplied with blower discharge air through an intake positioned adjacent the blower outlet.

9. The isolator of claim 5 wherein said conduit receives air from a blower cooling tube.

10. The isolator of claim 5 wherein said conduit extends into said isolator through the outside face thereof.

11. In an automobile having a blower with an air intake adjacent the curb side of the vehicle and a tailpipe on the same side, said intake being beneath the hood and in front of the windshield, and wherein a hood gasket engages the underside of the hood in front of said intake;
a blower intake isolator for restricting the flow of engine compartment and exhaust fumes into said intake,
said isolator comprising an air flow deflector having an apex secured to said gasket, on the curbside of the blower intake,
said isolator having an outside face which curves rearwardly and outwardly from said apex to an outer corner located inwardly adjacent the curbside fender,
said isolator having an inside face which extends from said apex inwardly and rearwardly of the blower intake, diagonally toward the centerline of said automobile,
a base extending between said faces and adjacent the windshield,
said outshield face of said isolator deflecting engine compartment fumes outwardly and away from the blower air intake,
said inside face of said isolator chaneling air to flow into said intake from a region above the centerline of the automobile,
air curtain means comprising,
a conduit supplying air discharged by the blower through the isolator to an outside nozzle, said nozzle located between the hood and the windshield, said nozzle directing flow outwardly as an air curtain projecting at an angle to the surface of the automobile,
and means defining a narrow slot between said isolator and an inside fender panel of said automobile, the flow of blower discharge air through said nozzle creating a reduced pressure at said slot, said outside face deflecting engine compartment fumes toward said slot, said reduced pressure at said slot drawing said engine compartment fumes outwardly with said curtain from said nozzle.

12. In an automobile having a blower with an air intake adjacent the curb side of the vehicle and a tailpipe on the same side, said intake being beneath the hood and in front of the windshield, and wherein a hood gasket engages the underside of the hood in front of said intake;
a blower intake isolator for restricting the flow of engine compartment and exhaust fumes into said intake,
said isolator comprising an air flow deflector having an apex secured to said gasket, on the curbside of the blower intake,
said isolator having an outside face which curves rearwardly and outwardly from said apex to an outer corner located inwardly adjacent the curbside fender,
said isolator having an inside face which extends from said apex inwardly and rearwardly of the blower intake, diagonally toward the centerline of said automobile,
a base extending between said faces and adjacent the windshield,
said outside face of said isolator deflecting engine compartment fumes outwardly and away from the blower intake,
said inside face of said isolator chaneling air to flow into said intake from a region above the centerline of the automobile,
said hood gasket being bulb-like in cross-section, and a plug-in connector extending from said isolator into the bulb portion of said hood gasket, thereby to secure the isolator to the gasket and to block flow through the gasket.

13. The isolator of claim 12 further wherein the isolator has a female portion which surrounds and seals the end of the hood gasket.

14. In an automobile having a blower which supplies air into the passenger compartment, which blower has an air intake adjacent the curb side, said intake being beneath the hood and in front of the windshield, a hood gasket engaging the underside of the hood in front of the intake to partially shield the intake from engine compartment fumes,
the improvement comprising,
a blower intake isolator for restricting the flow of engine compartment fumes around the gasket and into said intake,
said isolator comprising an air flow deflector mounted on the curbside of the blower inlet and seated against an end of said gasket,
said isolator having an outside face extending rearwardly and outwardly from said gasket to an outer corner located inwardly adjacent the curbside fender,
said isolator having an inside face which extends rearwardly of the blower intake,
a base extending between said faces and adjacent the windshield,
said outside face of said isolator deflecting engine compartment fumes outwardly and away from the blower air intake and thereby reducing the intake of such fumes by the intake.

* * * * *